May 3, 1932.  L. B. CHERRY  1,856,828
ART OF TREATING HYDROCARBONS
Filed March 11, 1922
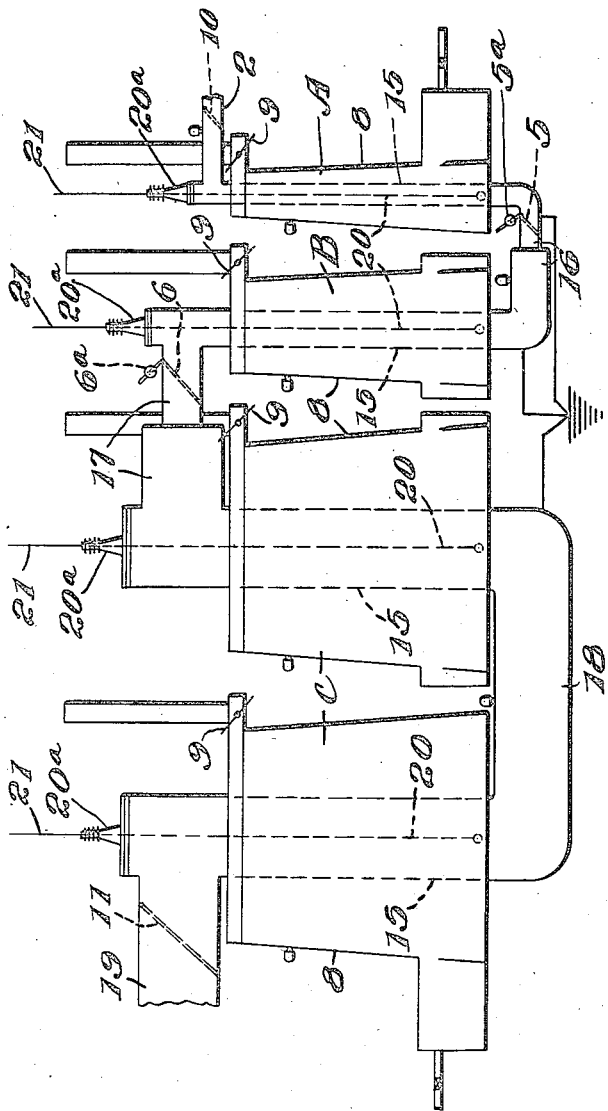
Inventor
Louie Bond Cherry
By Hubert E. Peck  Attorney Patented May 3, 1932

1,856,828

UNITED STATES PATENT OFFICE

LOUIS BOND CHERRY, OF LOUISVILLE, KENTUCKY, ASSIGNOR, BY MESNE ASSIGNMENTS, TO C AND C DEVELOPING COMPANY, OF KANSAS CITY, MISSOURI, A CORPORATION OF ARIZONA

ART OF TREATING HYDROCARBONS

Application filed March 11, 1922. Serial No. 542,980.

This invention relates to improvements in the art of treating hydrocarbons particularly in the production of hydrocarbons of low boiling point from higher boiling point hydrocarbons; and the objects and nature of the invention will be understood by those skilled in the art in the light of the following explanations of various steps that are followed in whole or in part and various requirements that are in whole or in part complied with in carrying out the method or process of this invention.

Heretofore, by a method of my invention, I vaporized crude oil as well as more or less heavy hydrocarbon distillates and passed the vaporous mixture through a reaction conduit having walls thereof heated to a red heat and subjected the vapors while under the influence of said red hot walls, to high frequency electrical discharges, and thereby forced rearrangements of the molecular structures of the vapors changing the high boiling point hydrocarbons into hydrocarbons of lower boiling points. However, certain difficulties were encountered in carrying on such method, among other reasons, because of (a) apparently uncontrolled surging in rates of distillation and flow of the vaporous mixture from the still through the reaction conduit, and uncontrolled pressure variations in said conduit as well as heretofore unexplained variations in the temperatures and velocity of the vapors while passing through the conduit, with unexepected variations in the final products; (b) lack of control over the reaction taking place in the reaction conduit and consequent uncertainty as to the characteristics of the final product even from a run of uniform raw material (crude oil and distillate), and also resulting in more or less wide, rapid and unexpected variations in the products produced and consequent lack of approximate certainty as to the final product under any conditions or from different kinds or grades of raw materials.

It is an object of my present invention to overcome these and other difficulties encountered in the practice of my former method, and to provide a method of and apparatus for converting heavy or high boiling point hydrocarbons into hydrocarbons of lower boiling points or of different boiling points, through or by which there will be greater control than heretofore over the reactions and certainty as to the character of the final product, or whereby a higher and more uniform conversion percentage will be assured.

With these and other objects in view, my invention consists in the method approximately as hereinafter pointed out and specified, and in apparatus as more fully and particularly set forth and hereinafter specified.

The accompanying drawings diagrammatically illustrate apparatus, as an example from among others that can be employed in carrying on my method, and are referred to herein to supplement and make clear to those skilled in the art, the following explanation of my method.

In carrying out my invention, the raw material (such as crude oil or distillates) is distilled and the resulting high boiling point hydrocarbon vapors are impressed with energy to force molecular vibration and such changes in molecular structures as to produce with approximate certainty the product desired.

Usually, the raw material (crude oil or distillate) is kept at an approximately constant level in any suitable still during distillation and a hydrogen supplying ingredient (if employed) such as steam, natural gas, etc. or a combination thereof, is constantly introduced into the liquid in the still during distillation so as to become thoroughly mixed with the vapors of distillation to produce the vaporous mixture that flows from the still for conversion according to my method. The vaporous mixture from the still is subjected under peculiar conditions, to cracking or dissociating influences and at the same time is excited by certain electrical influences that will check complete dissociation before free carbon is deposited and will force rearrangement of the molecular structures to produce hydrocarbon compounds of different, such as lower, boiling points than those of the raw material. Thereafter the resulting compounds are condensed, as will be understood by those skilled in the art.

The vaporous mixture is preferably subjected to the cracking and electrical exciting influences while being conducted through a reaction conduit, and I have discovered that the hereinbefore mentioned difficulties are reduced and that a desirable measure of control over the reactions in such conduit is attained, by approximately controlling the velocity and pressure of the vaporous mixture in different parts of said conduit to insure the desired synthesis or conversion when the method is being carried on to produce lower boiling point hydrocarbons of the paraffine series.

To this end, I divide the reaction conduit into any suitable number of stages, or what we will herein refer to as reaction tube units or stages, and each stage or unit can consist of one or more tubes with the tubes of all stages or units preferably coupled together in series so that the vaporous mixture from the still will flow through said stages or units in succession. In the particular example illustrated, I show three reaction tube stages or units A, B, C, without however desiring to so limit my invention, and the vaporous mixtures flow first to stage A through conduit 2 from any suitable still.

In practicing my method, it is desirable to operate the still to produce so far as possible, a continuous steady flow of vaporous mixtures to the reaction tubes, and in carrying on the method I provide pressure relief or controlling valves in the reaction conduit to approximately control the velocity of the mixture through the reaction conduit and the pressures in the various reaction tube units or stages. Also, I desire to approximately control the temperatures of the vaporous mixtures in the various reaction tube stages, all with the end in view of maintaining the desired reactions and predetermination of the characteristics of the final product where low boiling point hydrocarbons are sought. As to the valves, I preferably arrange a pressure reducing or controlling valve 5 located in the reaction conduit between the first reaction tube stage A and the second stage B; also a similar valve 6 in the conduit between the second reaction tube stage B, and the third stage C.

The valve 5 is preferably held under load to maintain some pressure in the still as well as in stage A, and the rate of distillation can be thereby controlled to a certain extent.

The valves 5, 6, are preferably of the swing check valve type arranged in the conduit to open under the pressure of the vaporous mixture in the direction of flow of said mixture forwardly through the reaction conduit. Each said valve is under load against opening and the load is manually controlled or adjustable to maintain the desired pressure in the stage behind the valve. For instance, each valve can be provided with an exterior weighted arm with the weight 5a, or 6a, manually adjustable on the arm to vary the load on the valve, and consequently vary the forward pressure in the conduit necessary to open the valve.

In carrying on my method to produce low boiling point hydrocarbons of the paraffine series, I allow or cause the vaporous mixture in passing through the reaction conduit to expand and reduce in pressure from stage to stage. I hence enlarge the diameter (or otherwise increase the internal capacity) of the reaction conduit that forms stage B with respect to the portion forming stage A, and also enlarge the diameter of (or increase the internal capacity) of the conduit portion forming stage C, with respect to stage B. Usually, these conduit portions are so proportioned as to length and diameter that the vaporous mixture entering stage B will expand and reduce in pressure to approximately fifty percent of the pressure in stage A. Also, in stage C, the vaporous mixture is allowed to expand so that the pressure in stage C is approximately fifty percent of that in stage B. The reaction tube stages are provided with independently controlled heating means by which the temperature of each tube (or stage) can be manually controlled independently of the temperatures of the remaining tubes or stages.

For this purpose, I show each vertical reaction tube provided with its own exterior heating furnace and combustion chamber. For instance, I show the major portion of each vertical tube surrounded by the exterior combustion chamber 8 of a gas burner furnace. This heating apparatus for the tube is equipped with manually controlled dampers 9 and valves so that the heat of the tube and of the vaporous mixture within the tube can be kept at the desired temperatures, as indicated by suitable pyrometers or other temperature indicators. These heating devices apply heat exteriorly to the reaction tubes and are designed to maintain (where desired) portions of the tube walls at approximately a bright red heat or to otherwise maintain an oil cracking or vapor dissociating temperature or influence within each (or one or more) of the reaction tubes.

In the particular example illustrated, a check valve 10 is located in conduit 2 between the still and the first reaction tube stage A to prevent back flow into the still, and also a check valve 11 is located in the conduit 19, between the last reaction tube stage C and the condenser to prevent back flow into the reaction tubes. However, I do not wish to so limit my invention.

In the example illustrated, the heated portions of the reaction tubes are vertical, and said tubes are coupled together by cross couplings or connections, 16, between the lower ends of tube stages A, B; 17 between the upper end of stage B and the first tube of stage C; and 18 between the lower ends of the two tubes of stage C, although I do not wish to so limit my invention.

In the example illustrated, the reaction tubes 15 of the several stages are composed of metal, such as iron or steel, and are suitably grounded, and each tube forms an electrode, while the opposing electrodes are formed by small wires 20 arranged within the tubes, one for each tube and alined with the longitudinal axis thereof, and insulated from the tube and suspended from an insulator 20a at the upper end of the tube. These electrodes 20 are electrically coupled with suitable electrical equipment through connections 21, and are designed to receive oscillatory high frequency electrical energy of such power and character as to cause a constant back and forth flow of high frequency discharge between the wires 20 and the tube walls and consequently radially of the tubes and through the vaporous mixtures therein. The size and capacity of the wires 20 and the character and voltages of the high frequency electrical energy, are such as to set up silent high frequency discharges (and avoid arcing which would destroy the wires 20) throughout the lengths of the wires that will excite the vaporous mixtures in the tubes and in connection with the energy radiating from the hot tube walls, will force molecular vibration in the vaporous mixtures to bring about the conversion sought and prevent substantial carbon deposit and other waste. I have, so far, attained the best results when the electrical energy discharged through and impressed on the vaporous mixtures in the reaction conduit is of such voltages and other characteristics as to cause an approximately violet glow in the tubes when tested with air in the tubes before the air is withdrawn from the tubes and the vaporous mixture is admitted thereto, even though varied within limits in each stage so that electrical conditions in the respective stages may be different at any instant.

The frequency and voltages of the oscillatory currents that form the silent discharges through the vaporous mixtures in the reaction conduit, should be varied to suit conditions in the various reaction tube stages and the product being converted, and if so desired can be different in each stage. As a general rule, I find that frequency varying from about 500,000 to upwards of 1,000,000 vibrations per second attains the best results whether the same electrical equipment is provided for all of the reaction tube stages, or separate electrical equipment is provided for each stage.

For instance separate electrical equipment (such as shown by my Patent No. 1,229,886, June 12, 1917) for each stage can be provided to attain independent control of the voltage and frequency of the electrical discharges in the stages, respectively.

I can independently control reaction conditions in each reaction tube stage by varying the tube temperature, by varying the electrical conditions therein, and by varying the pressure and velocity of the vaporous mixtures therein. In carrying out my method, I divide the treatment of the vaporous mixtures into stages. For instance, in stage A the mixture is confined within tube walls heated to approximately a bright red heat (the temperature of which is varied to suit conditions such as rate of distillation and quality of hydrocarbons being treated) and the destructive waves of heat energy radiating from these hot walls raise the temperature of the mixture and the rate of molecular vibration. While the mixture is thus subjected to this cracking or dissociating energy or influence, the mixture is kept from ionization to the point of dissociation by the influence and action of the high frequency oscillatory current discharge that is impressed thereon. The mixture is thus raised in temperature and placed in a state of unstable equilibrium and impressed with even a higher periodicity of vibration during its treatment in stage A by the radiant energy of the hot walls and high frequency discharge.

The mixture on entering stage B, expands and reduces in pressure (say fifty percent more or less) and the mixture is again impressed with the radiant energy from hot walls and the high frequency discharge.

On entering stage C, the mixture again expands and the pressure is reduced (say to fifty per cent more or less of that in stage B) and is again subjected to radiant energy from hot walls and the high frequency discharge. This treatment can be repeated through other stages, if found desirable, and on leaving the last stage of treatment the mixture is condensed and liquefied in the usual or any suitable manner to produce a low boiling motor fuel or low boiling point hydrocarbons for other purposes.

The desired reactions usually begin in the mixture while in stage A and result in increase in temperature in the mixture and these reactions usually continue through stages B and C. The temperatures of the reaction tubes are kept up to prevent loss of heat due to the heating, absorbing (endothermic) reactions. The energy of the high frequency discharge impressed on the mixtures prevents such complete cracking or dissociation as would result in substantial carbon deposit and other loss, and results in the formation of new hydrocarbon compounds of lower boiling points step by step or from lower boiling compound to still lower boiling compound, stage by stage, as hydrocarbons under reaction tend to reform into lower boiling compounds rather than into higher or heavier compounds.

By accelerating the molecular vibration of the vaporous mixture through the application of heat and high frequency oscillatory currents, as the mixture passes through the various reaction tube stages, under controlled conditions, series of reactions take place in the mixture during the transition or conversion of the heavy hydrocarbons from compound to compound, step by step, down the series of hydrocarbon compounds to the desired low boiling motor fuel or other boiling hydrocarbon mixture, with loss of by products reduced to the minimum.

I do not wish to limit my invention to the introduction of natural gas, hydrogen gas, steam or a combination of any of these hydrogen carrying ingredients, into the still or otherwise into the hydrocarbon vapors to supply the additional atoms of hydrogen needed in the formation of the lower boiling compounds, inasmuch as I can through my method produce low boiling motor fuel from heavy hydrocarbons without adding such hydrogen ingredient and without substantial carbon deposit.

I cannot at this time, specify exact rules and conditions for the conduct of my method with respect to specific temperatures and frequency of the oscillatory current applied, as different products, different rates of distillation, the velocity of the vaporous mixtures through the reaction tubes and the final products desired will require varying conditions as to operation. I have discovered, however, that while it is desirable to have an elevation of temperature applied to the vaporous mixture in the different reaction tube stages, the best exact temperature of such mixture must in each instance, be determined, at the time, by the operator. The preferable condition of operation as regards temperatures of the vaporous mixture and of the tubes and the velocity of the mixtures through such reaction tubes, when producing motor fuel from kerosene distillate, requires that the tubes be maintained at approximately not less than 525° C., and that the velocity of mixtures be such that in passing through such tubes they will not acquire a temperature much in excess of 50 percent of the temperature of the tubes.

It is well known that time is an important element in all chemical reactions, and I do not wish to limit myself to the above conditions as stated, as varying products under treatment will require different times for the completion of reactions and different degrees of energy to excite them to a change of molecular structure.

As the vaporous mixture in the conduit reduces in pressure in passing from stage to stage, said mixture in thus suddenly expanding absorbs energy from the hot metal walls and from the high frequency electrical discharge impressed thereon and hence rises in temperature, and such increase in temperature encourages, or aids in, the exothermic reactions, or possibly starts such reactions. During such reactions, the influence of the said electrical energy prevents the substantial formation of unsaturated hydrocarbons. During each reaction stage through which the vaporous mixture passes, said mixture absorbs energy (endothermic reactions) and this is followed by liberation of energy as exothermic reactions take place.

It will be noted, that in the apparatus diagrammatically illustrated, as an example, the radial distance across which the electrical discharges travel back and forth between wires 20 and the walls of the tubes, varies in the different reaction tube stages owing to the increase in tube diameter from stage to stage. This fact alone causes different electrical conditions in the different stages in that the voltage must increase as the radial distance between wires 20 and the tube walls increases.

However, I do not wish to so limit all features of my invention.

The vapor and gas mixture that includes hydrocarbon fractions having different critical temperatures of dissociation, enters the reaction conduit at a low pressure, say at about ten pounds per square inch, and this pressure (density) is progressively reduced from stage to stage by expansion, say to five pounds, and then to two and one-half pounds, while suitable temperatures at the stages, determined by conditions at the same time at each stage, are maintained by the independent heat controls of reaction tube units A. B. C. to bring the vapors up to or near the critical temperatures of dissociation of the combined mixture. In passing through the reaction conduit units, the mixture is acted on to encourage exothermic reactions by stages, and by exothermic reactions, I refer to association or synthesis of heavier into lighter products attended with evolution of heat, and such series of successive exothermic reactions, is encouraged or maintained by series of endothermic reactions, due to expansion and elevation of temperature. The method is carried on to produce or maintain at each stage, exothermic reactions as the result of or following endothermic reactions.

What I claim is:

1. In the treatment of hydrocarbons by distillation and subjecting the hydrocarbon vapors to the radiant energy of hot walls and high frequency oscillatory electrical discharges, that step which consists in causing the vapors to expand from stage to stage while subjecting the vapors to said radiant energy and electrical discharges.

2. In the treatment of hydrocarbons by distillation and then subjecting the high boiling point hydrocarbon vapors simultaneously to cracking influences and electrical discharges, that step which consists in retarding the forward passage of the vapors from time to time while advancing through a closed reaction conduit and while the vapors are being subjected to radiant heat energy and high frequency electrical discharges.

3. In apparatus for the treatment of hydrocarbon vapors and gases, a reaction conduit through which vapors are conducted embodying successive units and means to control the pressures in the units respectively; separately controlled heating means for the units, respectively; and means for subjecting the vapors in the units to electrical influences.

4. In apparatus for the treatment of hydrocarbon vapors and gases, reaction tube units for the passage of said vapors, said units being relatively formed to cause expansion of the vapors by units and provided with means for the approximate control of the pressures in the respective units, means for controlling the temperatures of the units and means for subjecting the vapors to electrical discharges.

5. In apparatus for the treatment of hydrocarbon vapors and gases, a reaction conduit for the passage of the vapors, and means for subjecting the vapors while in said conduit to red hot walls and electrical discharges, said conduit constructed and arranged to vary the pressure, and velocity of the vapors by stages as the vapors advance.

6. In the treatment of hydrocarbon vapors; advancing said vapors through a reaction conduit while expanding the same and controlling the velocity thereof as well as the temperature thereof by stages and subjecting said vapors to cracking influences and high frequency oscillatory electrical discharges.

7. In the treatment of hydrocarbon vapors; advancing said vapors through a reaction conduit while subjecting the same to the cracking influence of heat waves and to the cracking checking influence of high frequency electrical discharges of such voltage and characteristics as to maintain a violet glow in free air.

8. In the treatment of hydrocarbon vapors; advancing said vapors through a reaction conduit by stages while subjecting the same to waves radiating from red hot walls and to high frequency electrical discharges of increasing voltage stage by stage.

9. In the treatment of hydrocarbon vapors; advancing said vapors through a reaction conduit stage by stage while subjecting the vapors to high frequency electrical discharges and the energy from hot walls, and maintaining the temperatures externally applied to the conduit stage by stage as the energy is absorbed by the vapors as the vapors advance.

10. Apparatus for the conversion of hydrocarbons, including a reaction conduit for the vaporous mixture embodying successive expanding pressure controlling units provided with independently controlled heating means, respectively, and controlled means for subjecting the vapors in said units to variable electrical discharges.

11. Apparatus for the conversion of hydrocarbons, including a reaction conduit for the vaporous mixture embodying successive units provided with heating means, respectively, means whereby the vaporous mixture is caused to expand from unit to unit and means for subjecting the vaporous mixture in said units to controlled electrical discharges.

12. Apparatus for the treatment of hydrocarbons, including an elongated conduit for the vaporous mixture, means for maintaining hydrocarbon dissociating influences in various portions of said conduit; means for subjecting the vaporous mixture while under said influences to electrical discharges, and means for causing expansion of said vaporous mixture and reduction in the pressure thereof by stages while under said influences and electrical discharges.

LOUIS BOND CHERRY.